Sept. 17, 1929.  A. F. MASURY  1,728,875
FLEXIBLE CONNECTION FOR MOTOR VEHICLE PANELS
Filed Sept. 1, 1928
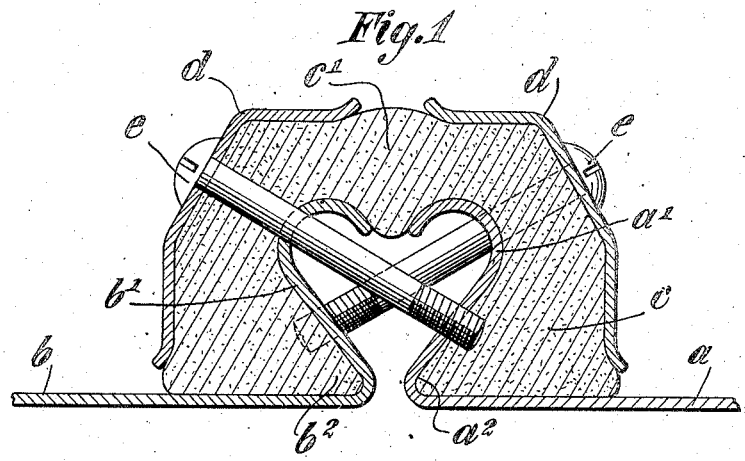
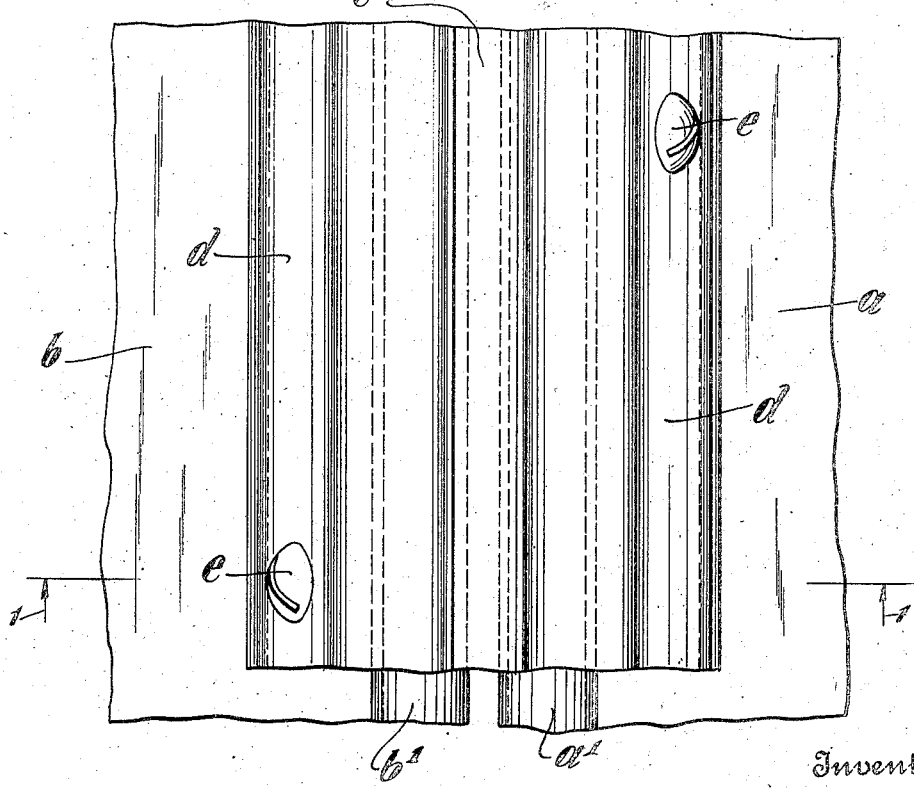
Inventor
Alfred F. Masury,
By his Attorneys
Redding, Greeley, O'Shea & Campbell Patented Sept. 17, 1929

1,728,875

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

FLEXIBLE CONNECTION FOR MOTOR-VEHICLE PANELS

Application filed September 1, 1928. Serial No. 303,466.

This invention relates to an improved connection between adjacent panels for use particularly in connection with motor vehicle bodies. It has been found desirable to construct motor vehicle bodies of a plurality of panels in order to impart greater flexibility thereto. In order that the panels may be connected effectively, it is necessary that the connections be sufficiently strong to withstand the stresses and strains to which they are subjected during operation of the vehicle. Many such connections have been found objectionable by reason of the fact that squeaking and drumming of the body results. As a further consideration, the panels and connections must be so formed that they can be readily manufactured at a cost which is not prohibitive.

Accordingly, an object of the present invention is to provide a connection which may be formed in the panels by a simple stamping operation, thus materially reducing the cost of manufacture, as well as to provide a connection which is strong and capable of eliminating body squeaks and drumming. By securely connecting the panels through a non-metallic yielding connection, vibrations are not transmitted therebetween and a highly successful connection results.

More specifically the invention includes panels, the adjacent edges of which are formed with turned back extensions. Nonmetallic yielding moulding overlies the extensions and is provided with independent cover strips which are connected to the extension of the opposite panel by bolts which pass through the moulding and the extension of the adjacent panel.

Further advantages will appear as the invention is described more fully and reference will now be had to the accompanying drawings, wherein:

Figure 1 is a view in section taken on line 1—1 of Figure 2 and looking in the direction of the arrows, showing a preferred form of connection.

Figure 2 is a plan view of the connection shown in Figure 1.

Referring to the above drawings, $a$ designates a panel to be mounted upon the body of the vehicle and formed with a hook shaped extension $a'$ at one side thereof which includes an acute angle $a^2$. An adjacent panel $b$ is formed with a similar extension $b'$ forming a similar angle $b^2$.

A strip of non-metallic yielding moulding $c$ which is generally M-shaped in cross section is formed with legs which engage the reentrant angles $a^2$ and $b^2$ and with an enlarged portion $c'$ to space the panels apart. Metallic strips $d$ are formed to lie over the moulding and bolts $e$ pass through the strips and adjacent extensions $a'$ and $b'$ and are screwed into the distant extensions $b'$ and $a'$. This is clearly shown in Figure 1.

It will be seen that the compression set up in the moulding $c'$ may be varied as desired and the strength of the connection is amply sufficient to receive the stresses and strains occasioned during operation of the vehicle.

While the invention has been shown and described in connection with the specific construction shown in the accompanying drawings, it is not to be limited, save as defined in the appended claims.

I claim as my invention:

1. A connection of the character described comprising a panel, an adjacent panel to be connected thereto, hook shaped extensions on the panels forming acute angles with the respective panels, non-metallic yielding moulding having extensions lying in the angles formed between the hook shaped extensions and the respective panels, cover strips at the sides of the moulding, and means to secure the cover strips to the extensions and moulding.

2. A connection of the character described comprising a panel, an adjacent panel to be connected thereto, hook shaped extensions on the panels forming acute angles with the respective panels, nonmetallic yielding moulding having extensions lying in the angles formed between the hook shaped extensions and the respective panels, cover strips at the sides of the moulding, and means to secure the cover strip of one side to the extension at the other side of the moulding.

3. A connection of the character described comprising a panel, an adjacent panel to be connected thereto, hook shaped extensions on the panels forming acute angles with the respective panels, non-metallic yielding moulding having extensions lying in the angles formed between the hook shaped extensions and the respective panels, cover strips at the sides of the moulding, and bolts securing the cover strips to the extensions of the opposite panels.

4. A connection of the character described comprising a panel, an adjacent panel to be connected thereto, hook shaped extensions on the panels forming acute angles with the respective panels, non-metallic yielding moulding having extensions lying in the angles formed between the hook shaped extensions and the respective panels, cover strips at the sides of the moulding, and bolts securing the cover strips to the extensions of the opposite panels, said bolts passing through the moulding and both extensions.

This specification signed this 27th day of August, A. D. 1928.

ALFRED F. MASURY.